United States Patent Office 2,834,772
Patented May 13, 1958

2,834,772
METALLIZED COMPOUNDS OF 3-AMINO-4-HYDROXYBENZENE SULFONYLMORPHOLINE AZO DYESTUFFS

Albert F. Strobel, Phillipsburg, N. J., and William W. Williams, Easton, Pa., assignors to General Aniline & Film Corporation, New York, N. Y., a corporation of Delaware No Drawing. Application August 20, 1954
Serial No. 451,292
6 Claims. (Cl. 260—147)

The present invention relates to a new class of metallized monoazo dyes obtained by metallizing the product obtained by coupling the diazo of 3-amino-4-hydroxybenzene sulfonylmorpholine with 1-aryl-3-methyl-5-pyrazolones, yielding yellow brown to orange shades on wool and nylon of very good light and wash fastness.

Chromed monoazo dyestuffs derived from the coupling of the diazo of 2-amino-1-phenol-4-sulfamide and 2-amino-1-phenyl-4-sulfondimethylamide with 1-phenyl-3-methyl-5-pyrazolone are known to yield orange shades on wool and nylon of poor wash fastness.

We have found that monoazo dyes obtained by coupling the diazonium salt of 3-amino-4-hydroxybenzene sulfonylmorpholine with 1-aryl-3-methyl-5-pyrazolones yields dyes giving yellow brown to orange shades on wool and nylon. The dyes are not only characterized by their very good light and wash fastness, but also are adaptable as spirit soluble dyes and for solvent dyeing of hydrophobics. These dyes after metallizing are characterized by the following general formula:

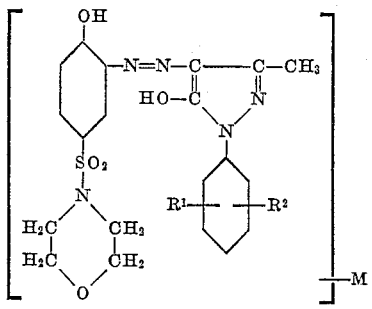

wherein $R^1$ and $R^2$ represent either hydrogen, chlorine, lower alkyl, e. g. methyl, ethyl, propyl, butyl, etc., lower alkoxy, e. g. methoxy, ethoxy, propoxy, butoxy, etc., sulfamyl, alkyl sulfamyl, e. g. methyl sulfamyl, ethyl sulfamyl, propyl sulfamyl, butyl sulfamyl, etc., dialkyl sulfamyl, e. g. dimethyl-, diethyl-, dipropyl-, dibutyl-sulfamyl, etc., sulfonylmorpholine, etc., and wherein M represents either chromium or cobalt.

The dyes characterized by the above general formula are readily obtained by coupling diazonium salt of 3-amino-4-hydroxybenzene sulfonylmorpholine with 1-phenyl-3-methyl-5-pyrazolone.

The 3-amino-4-hydroxybenzene sulfonylmorpholine is prepared in the following manner:

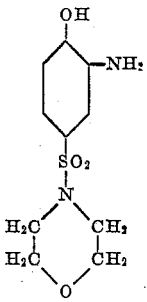

4-hydroxy-3-amino-benzene sulfonmorpholide

Into a 3-liter flask equipped with a stirrer, thermometer, and condenser fitted with an HCl trap and dropping funnel was charged 1100 grams chlorosulfonic acid. It was heated to 80° C., then over a 1-hour period 316 grams of 2-chloronitrobenzene was added. The reaction mixture was stirred 6 hours at 125° C. Then it was allowed to stand overnight. It was then drowned in about 6 liters of ice-water slush at —5–0° C. The slurry was stirred ½ hour and then filtered by suction. The wet cake was washed on the funnel with 1500 ml. ice-water.

Into an 8-liter battery jar was charged 435 grams of morpholine (=5 moles) and 4000 ml. ice-water slush. The jar was cooled by an ice-bath, and at 5° C. 586 grams of the above product was added slowly (over a period of 20 minutes). The slurry was stirred 6 hours at 5–10° C. and then the stirring was continued overnight. The temperature was raised to 60° C. 150 ml. 18% hydrochloric acid was added. The slurry was cooled to 15° C. and filtered. The wet cake was washed on the funnel with 2000 ml. ice water. It was allowed to stand in air overnight at room temperature (presscake). The weight of the presscake obtained amounted to 566 grams.

Into a 5-liter flask was charged 2700 ml. water and 360 grams of sodium hydroxide pellets. It was warmed to 90° C. and 508 grams of the presscake obtained above was added. The reaction mixture was stirred at reflux temperature for 5 hours, then filtered at 90° C. To the filtrate was added 1 liter water and 1240 ml. 18.5% hydrochloric acid to bring the material to congo acidity. The wet filter cake was washed on the funnel with 2500 ml. ice water.

Into a 5-liter flask equipped with stirrer, thermometer, condenser and heating mantle was charged a hot solution of 960 grams of sodium sulfide.9H$_2$O (=4.0 moles) in 1800 ml. water. Then 400 ml. 40% NaOH (=4.0 moles) was added. The solution was heated to 95° C. and the presscake from above was added. The reaction mixture was refluxed 3 hours at 97° C. The charge was filtered by suction. The filtrate was charged into an 8-liter battery jar and 2100 ml. 18.5% hydrochloric acid was added. The charge was stirred ½ hour at 95° C., and filtered hot. The sulfur cake was washed on the funnel with 800 ml. hot water. To the combined filtrate and washings was added 145 ml. 40% sodium hydroxide to pH=6.5. The slurry was cooled to 10° C. and filtered. The filter cake was washed on the funnel with 400 ml. ice water and air dried at 65° C.

The diazonium salt of the resulting sulfonylmorpholine is prepared in the conventional manner.

As the diazo component a 1-aryl-3-methyl-5-pyrazolone is employed in the coupling reaction, the phenyl substituent of which may be either substituted or unsubstituted. As examples of such pyrazolones, the following are illustrative.

1-phenyl-3-methyl-5-pyrazolone
1-(2',5',-dichloro-phenyl)-3-methyl-5-pyrazolone
1-(3',4'-dichloro-phenyl)-3-methyl-5-pyrazolone
1-(3'-sulfamyl-phenyl)-3-methyl-5-pyrazolone
1-2'-methoxyphenyl-3-methyl-5-pyrazolone
1-(3'-morpholinylsulfonylphenyl)-3-methyl-5-pyrazolone
1-(4'-dimethyl sulfamylphenyl)-3-methyl-5-pyrazolone
1-(3'-ethylsulfamylphenyl)-3-methyl-5-pyrazolone
1-(2'-chlorophenyl)-3-methyl-5-pyrazolone
1-(2'-chloro-4'-dimethyl sulfamylphenyl)-3-methyl-5-pyrazolone The metallizing of the dyes shown by the above general formula is carried out by the usual procedures. For the purpose of the present invention, we prefer to form the cobalt and chromium complexes.

The following examples illustrate how the new class of monoazo dyestuff is prepared together with the formation of their cobalt and chromium complexes. All the parts given are by weight unless otherwise noted:

*Example I*

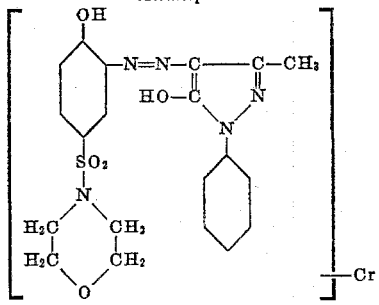

23.2 parts of 3-amino-4-hydroxybenzene sulfonylmorpholine was dissolved in 75 ml. water and 12.5 ml. conc. hydrochloric acid was added and the material cooled to 5° C. 20.2 ml. of 30% sodium nitrite (wt./vol.) was added slowly at 5° C. The diazo was stirred for 25 minutes and 1.4 ml. sulfamic acid was added. A coupler solution was prepared by dissolving 16.6 parts 1-phenyl-3-methyl-5-pyrazolone at room temperature in 190 ml. water with 25 ml. conc. ammonia. The cloudy solution was filtered to remove impurities. The solution of coupler was cooled to 15° C. and the diazo solution added to it. The coupling was completed almost immediately. The slurry was stirred for ½ hour and then filtered. The wet cake was washed on the funnel with 200 ml. water, then dried overnight at 65° C. The yield obtained was 39.5 parts.

Chroming of the dye was carried out by mixing the 39.5 parts of dye with 35.8 parts chromium formate paste (6.4/69 moles) and 240 ml. formamide. The reaction mixture was stirred 6 hours at 98° C. on the steam bath. Then it was poured hot into 800 ml. water. 50 parts salt was added. The slurry was stirred 20 minutes and filtered by suction. The filter cake was washed on the funnel with 300 ml. of 30% salt solution and then dried in air at 65° C.

The dry dye was kneaded for 3 hours in a Werner-Pfleiderer mixer with an equal weight of the formaldehyde condensation product of naphthalene-2-sodium-sulfonate. Small portions of water were added occasionally to keep the material in the form of a viscous paste during the milling. After the kneading, the material was dried with steam. The dry dispersed dye was dyed on wool as follows:

0.2 part of the dispersed dye, 0.3 part of ammonium sulfate was added to 300 ml. water. A 10 part sample of wool cloth was added to the dye bath and the temperature was raised to 100° C. over a period of 45 minutes, the cloth being agitated in the dye bath constantly. The temperature was held at 100° C. for one hour, after which the orange dyed cloth was removed, rinsed and dried. The exhaust from the dye bath was practically complete. The dyed cloth showed outstanding fastness to light, and showed very small loss in strength after subjecting it to AATCC wash test No. 3.

*Example II*

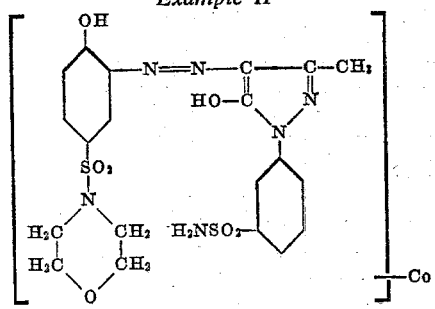

23.2 parts of 3-amino-4-hydroxybenzene sulfonylmorpholine was diazotized as in Example I. A coupler solution was prepared by dissolving 24.15 parts of 1-(3'-sulfamylphenyl)-3-methyl-5-pyrazolone in 300 ml. water and adding 24 ml. of 40% (wt./vol.) sodium hydroxide. The diazo was added to the coupler with stirring, and was followed by addition of 250 ml. 20% (wt./vol.) sodium carbonate. The foam was destroyed by the addition of several drops of Hexalin (cyclohexanol). Coupling occurred almost immediately, stirring was continued one hour, after which the material was filtered. It was air-dried at 65° C. Dry weight=35 parts. The dry unmetallized dye was slurried with 600 ml. of isopropanol, 6.48 parts (=3/69 moles) of cobaltous chloride hexahydrate added, and the mixture heated at reflux for four hours. It was then poured into 400 ml. water. The isopropanol was evaporated and the resulting aqueous slurry was filtered and dried to give 28 parts dry dye. The dye was dispersed as in Example I. The material dyed wool and nylon a yellow-brown shade with very good light and wash fastness.

*Example III*

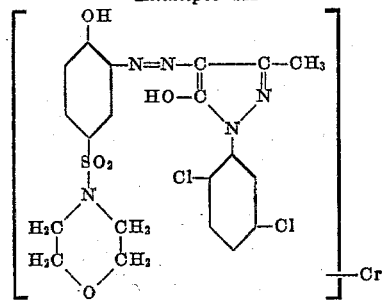

This dye was prepared in the same manner as the dye of Example I, using an equimolar proportion of 1-(2',5'-dichlorophenyl)-3-methyl-5-pyrazolone in place of the 1-phenyl-3-methyl-5-pyrazolone of Example I. The final dispersed metallized dye gives an orange shade on wool and nylon which is slightly less level than the dye of Example I, but which has slightly better wash fastness and slightly better light fastness than the dye of Example I.

*Example IV*

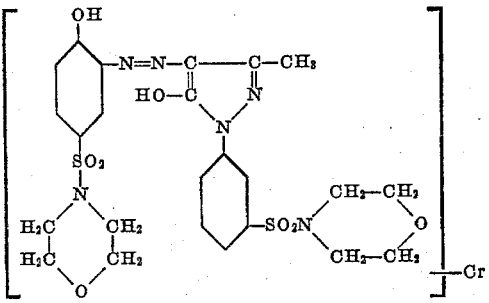

Example II was repeated with the exception that 24.15 parts of 1-(3'sulfamylphenyl)-3-methyl-5-pyrazolone were replaced by an equivalent amount of 1-(3'-morpholinylsulfonylphenyl)-3-methyl-5-pyrazolone.

The dye was applied exactly as the dye of Example I and gave the same results.

*Example V*

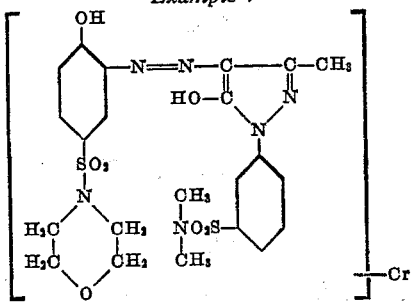

Example II was again repeated with the exception that 24.15 parts of 1-(3'-sulfamylphenyl)-3-methyl-5-pyrazolone were replaced by an equivalent amount of 1-(4'-dimethylsulfamylphenyl)-3-methyl-5-pyrazolone.

The dye was applied exactly as the dye of Example I and gave the same results.

In order to ascertain what effect, if any, the replacement of the diazo of 2-amino-1-phenol-4-sulfamide by 2-amino-1-phenol-4-sulfonmorpholine and 2-amino-1-phenol-4-sulfondimethylamide would have on the metallized azo dye when coupled with the pyrazolones as in the foregoing examples, the following dyes were prepared:

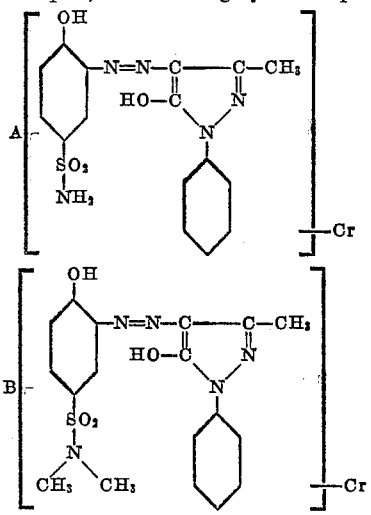

The foregoing dyes A and B and the dye of Example I were subjected to one washing according to the AATCC was test #3. Dye B lost twice as much and dye A lost more than four times as much of tinctorial strength than the dye of Example I in one washing according to the test. In addition, the dye of Example I stains other fibers less than dyes A and B in the AATCC wash test.

What we claim is:

1. The metallized compounds of a monoazo dyestuff, containing a metal selected from the class consisting of chromium and cobalt, having the following general formula:

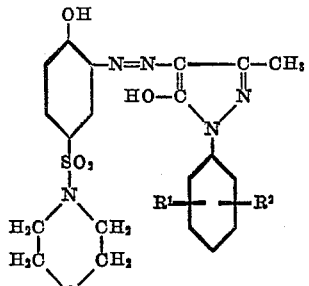

wherein $R^1$ and $R^2$ represent a member selected from the class consisting of hydrogen, chlorine, lower alkyl, lower alkoxy, sulfamyl, lower alkyl sulfamyl, lower dialkyl sulfamyl, and sulfonylmorpholine radicals.

2. The chromium complex compound of the monoazo dyestuff having the following formula:

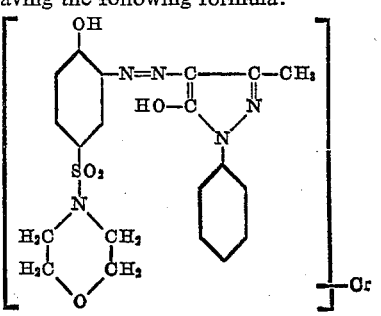

3. The cobalt complex compound of the monoazo dyestuff having the following formula:

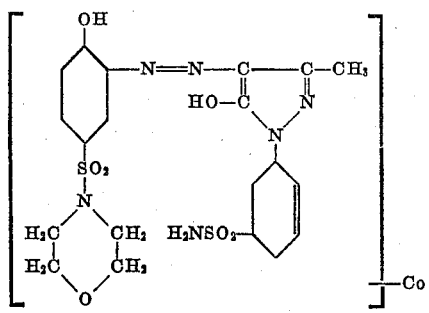

4. The chromium complex compound of the monoazo dyestuff having the following formula:

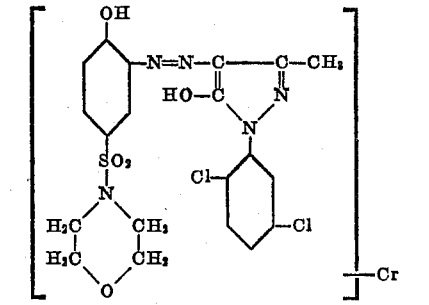

5. The chromium complex compound of the monoazo dyestuff having the following formula:

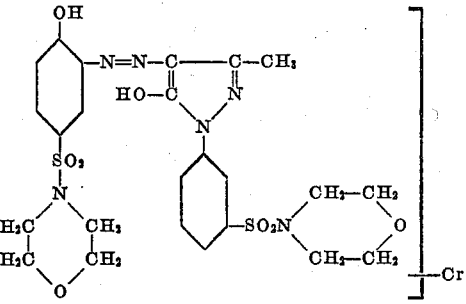

6. The chromium complex compound of the monoazo dyestuff having the following formula:

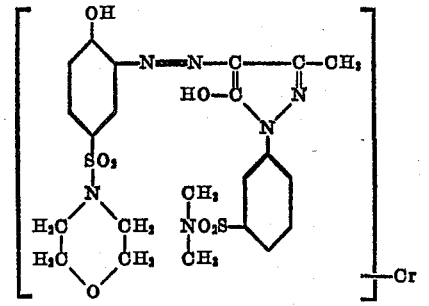

References Cited in the file of this patent

UNITED STATES PATENTS

| | | |
|---|---|---|
| 2,200,005 | McNally et al. | May 7, 1940 |
| 2,224,144 | Dickey et al. | Dec. 10, 1940 |
| 2,683,707 | Brassel | July 13, 1954 |
| 2,734,895 | Zickendraht et al. | Feb. 14, 1956 |

FOREIGN PATENTS

| | | |
|---|---|---|
| 513,360 | Belgium | Feb. 6, 1953 |
| 513,489 | Belgium | Feb. 13, 1953 |